United States Patent
Prast et al.

(10) Patent No.: US 12,083,541 B2
(45) Date of Patent: Sep. 10, 2024

(54) CYCLONIC FLUID SEPARATOR

(71) Applicant: TWISTER B.V., Rijswijk (NL)

(72) Inventors: Bart Prast, Leiden (NL); Marco Betting, Woerden (NL); Pieter Wolter Berghuis, Hoorn (NL); Tijmen Antonie Ton, Utrecht (NL)

(73) Assignee: TWISTER B.V., Rijswijk (NL)

( * ) Notice: Subject to any disclaimer, the term of this patent is extended or adjusted under 35 U.S.C. 154(b) by 49 days.

(21) Appl. No.: 17/602,487

(22) PCT Filed: Apr. 9, 2020

(86) PCT No.: PCT/EP2020/060227
§ 371 (c)(1),
(2) Date: Oct. 8, 2021

(87) PCT Pub. No.: WO2020/208173
PCT Pub. Date: Oct. 15, 2020

(65) Prior Publication Data
US 2022/0203381 A1 Jun. 30, 2022

(30) Foreign Application Priority Data
Apr. 11, 2019 (NL) .................................. 2022927

(51) Int. Cl.
*B01D 45/16* (2006.01)
*B01D 53/00* (2006.01)
(Continued)

(52) U.S. Cl.
CPC ................ *B04C 3/06* (2013.01); *B01D 45/16* (2013.01); *B01D 53/002* (2013.01); *B01D 53/24* (2013.01);
(Continued)

(58) Field of Classification Search
CPC ............... B04C 3/06; B04C 2003/003; B04C 2003/006; B01D 45/16; B01D 53/002;
(Continued)

(56) References Cited

U.S. PATENT DOCUMENTS 3,597,901 A * 8/1971 Heeney .................. B01D 47/10
96/323
4,327,757 A 5/1982 Weevers
(Continued)

FOREIGN PATENT DOCUMENTS

CN 202376860 U 8/2012
CN 102407063 B 9/2013
(Continued)

*Primary Examiner* — Dung H Bui
(74) *Attorney, Agent, or Firm* — The Webb Law Firm

(57) ABSTRACT

Provided is a cyclonic fluid separator, method of fluid separation, and a method of installing a cyclonic fluid separator. The cyclonic fluid separator includes a throat portion arranged between a converging fluid inlet section and a diverging fluid outlet section including an inner primary outlet for condensables depleted fluid components and an outer secondary outlet for condensables enriched fluid components. A central body extends along a central axis of the cyclonic fluid separator through at least part of the inlet section of the separator. The central body has, at a location upstream of the throat portion, a larger outer width than a smallest inner width of the throat portion; swirl imparting means arranged in the inlet section for creating a swirling motion of the fluid within at least part of the separator. The swirl imparting means are adjustable; and an adjusting mechanism configured for adjusting the swirl imparting means for varying the swirling motion of the fluid.

12 Claims, 11 Drawing Sheets

(51) Int. Cl.
 *B01D 53/24* (2006.01)
 *B04C 3/06* (2006.01)
 *B04C 3/00* (2006.01)

(52) U.S. Cl.
 CPC .. *B04C 2003/003* (2013.01); *B04C 2003/006* (2013.01)

(58) Field of Classification Search
 CPC .............. B01D 53/24; B01D 2256/245; B01D 2257/702
 See application file for complete search history.

(56) References Cited

U.S. PATENT DOCUMENTS

| | | | | |
|---|---|---|---|---|
| 4,783,204 | A * | 11/1988 | Roarty | G21C 15/16 55/393 |
| 6,280,502 | B1 * | 8/2001 | van Veen | B04C 3/00 95/32 |
| 8,528,360 | B2 * | 9/2013 | Betting | F25J 3/0209 62/619 |
| 8,852,323 | B2 | 10/2014 | Schook | |
| 9,625,055 | B2 * | 4/2017 | Ter Haar | F16K 47/08 |
| 10,794,225 | B2 * | 10/2020 | Frey | B01D 5/0057 |
| 2003/0145724 | A1 * | 8/2003 | Betting | B01D 53/002 96/389 |
| 2008/0173363 | A1 * | 7/2008 | Betting | B01D 17/0217 55/461 |
| 2009/0031756 | A1 * | 2/2009 | Betting | F25J 3/0233 62/620 |
| 2012/0024690 | A1 | 2/2012 | Betting et al. | |
| 2012/0090467 | A1 | 4/2012 | Betting et al. | |
| 2013/0019612 | A1 | 1/2013 | Favilli et al. | |
| 2018/0016944 | A1 | 1/2018 | Buhler et al. | |
| 2020/0206668 | A1 * | 7/2020 | Miyazawa | B01D 45/14 |

FOREIGN PATENT DOCUMENTS

| | | |
|---|---|---|
| CN | 205361688 U | 7/2016 |
| WO | 03029739 A2 | 4/2003 |
| WO | 2006070020 A1 | 7/2006 |
| WO | 2008118018 A1 | 10/2008 |
| WO | 2011014059 A1 | 2/2011 |

* cited by examiner

CYCLONIC FLUID SEPARATOR

CROSS-REFERENCE TO RELATED APPLICATIONS

This application is the United States national phase of International Application No. PCT/EP2020/060227 filed Apr. 9, 2020, and claims priority to The Netherlands Patent Application No. 2022927 filed Apr. 11, 2019, the disclosures of which are hereby incorporated by reference in their entirety.

BACKGROUND OF THE INVENTION

Field of the Invention

The present patent disclosure concerns a cyclonic fluid separator, a method of fluid separation and a method of installing a cyclonic fluid separator.

Description of Related Art

Patent document WO 03/029739 A2 describes a cyclonic fluid separator with a vortex generator in the inlet section. The separator comprises a central body from which extend static guide vanes located in the inlet section of the separator and having a certain angle with respect to the incoming axial flow to provide swirling motion to the fluid to be separated.

Patent document US 2012/0090467 A1 describes a separation system comprising a swirl valve, in particular a Joule Thomson (JT) valve having a primary function of flow rate control and used for creating a liquid phase to be separated. A piston-type valve body is moved inside a perforated sleeve to control the fluid flow. It is an object of the present patent disclosure to provide an improved cyclonic fluid separator.

SUMMARY OF THE INVENTION

To this end, according to a first aspect there is provided a cyclonic fluid separator comprising a throat portion arranged between a converging fluid inlet section and a diverging fluid outlet section comprising an inner primary outlet for condensables depleted fluid components and an outer secondary outlet conduit for condensables enriched fluid components; a central body extending along a central axis of the cyclonic fluid separator through at least part of the inlet section of the separator, wherein the central body has, at a location upstream of the throat portion, a larger outer width or outer diameter than an inner width or inner diameter of the throat portion; a housing in which the central body is arranged such that an annulus is present between an inner surface of the housing and an outer surface of the central body, wherein a cross sectional area of the annulus gradually decreases downstream of the swirl imparting means; swirl imparting means arranged in the inlet section for creating a swirling motion of the fluid within at least part of the separator, wherein the swirl imparting means are adjustable; and an adjusting mechanism configured for adjusting the swirl imparting means for varying the swirling motion of the fluid.

The separator advantageously enables variability and control of the swirling motion imparted to the flow in the inlet section. Therefore, the separator can be adjusted to changing process conditions and is thus highly flexible in its application. Also, the separation performance of the separator can be optimized when it is installed. Furthermore, beneficially the design can be standardized for a certain range or ranges of process conditions.

By varying the swirling motion, the time period for the particles to drift to an outer circumference of the flow area along the length of a intermediate section between the inlet section and the outlet section can be controlled such that for given properties of the fluid to be separated, the separation is improved and a larger amount of the condensed and/or solidified condensables are discharged via the outer secondary outlet. Thus, an increase in the swirling motion, which may be seen as an increase in a tangential velocity of the fluid compared to the central axis of the separator, would cause a decrease in the axial velocity of the fluid and therefore result in a less deep expansion of the fluid. The opposite would hold for a decrease in the swirling motion. In the valve of US 2012/0090467 A1, on the other hand, the control of the piston-type valve body is done to change the flow rate and not to adapt the tangential velocity of the fluid for changing a degree of separation.

It is preferred that the swirl imparting means comprise a plurality of flow passages positioned in a flow path that extends from the inlet section towards the outlet section, wherein the flow passages have an at least partially tangential orientation relative to the central axis, wherein the adjusting mechanism comprises at least one movably arranged adjusting element configured for adjusting a shape of the plurality of flow passages for adjusting the swirl imparting means for varying the swirling motion of the fluid.

The flow passages cause the fluid to obtain a swirling flow around the central body. In other words, the fluid flowing into the separator—having a flow direction substantially coaxial with the central axis of the separator—is at least partially redirected in a flow direction that is tangential with respect to the central axis. The adjusting element is suitably configured to adjust the shape of the plurality of flow passages, each flow passage separately or the plurality of flow passages as a whole, such that the flow direction is adjustable.

It is preferred that the central body has, at a location upstream of the throat portion, a larger outer width than a smallest inner width of the throat portion.

Optionally, the adjusting mechanism is configured for adjusting the shape of the plurality of flow passages by adjusting a flow cross section available for fluid flow defined by the plurality of flow passages. The flow cross section can be changed either for each of the flow passages or for all flow passages of the plurality of flow passages simultaneously.

Preferably, the adjusting mechanism is configured to adjust the swirl imparting means such that, relative to the central axis, a ratio of a tangential component of a flow velocity of fluid flow passing the swirl imparting means to an axial component of the flow velocity is in the range of 0.4 to 2.1, preferably 0.7 to 1.4. In terms of a flow direction of the fluid flow passing the swirl imparting means with respect to the central axis, these ranges correspond respectively to 25° to 65°, preferably 35° to 55°. Especially in the field of natural gas processing, these ranges provide an especially suitable adaptability of the separator with variable swirling motion. The width of the annulus is preferably designed such that cross sectional area of the annulus gradually decreases downstream of the swirl imparting means, such that in use the swirling fluid is expanded and the fluid velocity in the annulus gradually increases and reaches a supersonic speed at a location downstream of the swirl imparting vanes. In such case the width of the annulus may vary such that, at the prevailing pressure difference between the inlet section and the outlet section during normal operation of the separator, the fluid flowing through the annulus reaches a supersonic velocity at or near an intermediate section of the tail section of the central body.

In a preferred implementation, the adjusting mechanism comprises a rotatable cylindrical part or element rotatably arranged around the central body, wherein the adjusting element is arranged to be moved by rotation of the rotatable cylindrical part. The cylindrical part provides an especially practical way of moving the adjusting element in the confined space of the separator at and around the central body.

Preferably, the adjusting mechanism further comprises an elongated drive stem arranged rotatably around its longitudinal axis through an opening in the housing and configured to drive the rotation of the rotatable cylindrical part around the central body. The drive stem is particularly useful as it provides a compact way to drive the rotation of the rotatable cylindrical part.

It is preferred that, when rotating the drive stem, a rotating first end of the drive stem is arranged such that it drives a rotation of the rotatable cylindrical part. Preferably, the first end of the drive stem comprises a gear, such as a crown gear, a bevel gear or a spiral bevel gear, and the rotating cylinder comprises a complementary gear along at least a part of its outer surface.

In an embodiment, the swirl imparting means comprise a fixedly arranged cylindrical cage part or element positioned around the central body, wherein the cylindrical cage part comprises the plurality of flow passages, wherein the adjusting element is a cylindrical sliding part or element configured to slide along the cylindrical cage part and to cover or close at least a part of the plurality of flow passages thereby adjusting the swirl imparting means for varying the swirling motion of the fluid, wherein preferably the cylindrical sliding part is arranged to slide along a flow exit side of the cylindrical cage part.

The cylindrical sliding part is preferably configured to leave open at least 20% of a total flow cross section of the flow passages available for fluid flow.

Preferably, the rotatable cylindrical part and the cylindrical sliding part are arranged such that a rotational movement of the rotatable cylindrical part causes the cylindrical sliding part to slide along the cylindrical cage part.

It is preferred that the rotatable cylindrical part comprises a protrusion, and wherein the cylindrical sliding part comprises a spiral groove, wherein the rotatable cylindrical part and the cylindrical sliding part are arranged such that the protrusion extends in the spiral groove and the cylindrical sliding part is configured to slide along the cylindrical cage part by rotation of the protrusion. This combination of protrusion and spiral groove provides a particularly advantageous way of moving the cylindrical sliding part within the limited available space in the separator.

Preferably, the cylindrical cage part comprises a plurality of perforations forming the plurality of flow passages, wherein the perforations extend through the cylindrical cage part in the at least partially tangential orientation relative to the central axis.

Preferably, the plurality of perforations are a plurality of rectangular openings or slots forming the plurality of flow passages, wherein the plurality of rectangular openings extend with a longitudinal axis thereof substantially parallel to the central axis. Rectangular openings or slots have the advantage of having continuous trim and providing more area per unit of length of the opening. The flow has a certain axial component relative to the central axis when flowing through these slots.

Alternatively, the plurality of perforations each extend through the cylindrical cage part with a longitudinal axis having an at least partially radial orientation relative to the central axis and the at least partially tangential orientation relative to the central axis. The perforations preferably have a transverse cross section having a substantially circular, rectangular or square shape. These perforations better ensure that the flow exits the cage tangentially, since they have a smaller axial component relative to the central axis.

It is preferred that the cylindrical cage part is fixedly connected at a first thereof to the central body and at a second end thereof to the housing.

In one variation, the first end of the cylindrical cage part faces an inlet side of the separator, and the second end of the cylindrical cage part faces an outlet side of the separator, wherein an inner side of the cylindrical cage part is the flow exit side, wherein the inner side of the cylindrical cage part is spaced from an opposing outer surface of the central body.

Preferably, the rotatable cylindrical part is rotatably arranged in a groove or opening in the central body, the protrusion extends from an outer surface of the rotatable cylindrical part, and the spiral groove is arranged on an inner surface of the cylindrical sliding part.

In another variation, the first end of the cylindrical cage part faces an outlet side of the separator, and the second end of the cylindrical cage part faces an inlet side of the separator, wherein an outer side of the cylindrical cage part is the flow exit side, wherein the outer side of the cylindrical cage part is spaced from an opposing inner surface of the central body.

Preferably, the rotatable cylindrical part is rotatably arranged in a groove or opening in the housing, the protrusion extends from an inner surface of the rotatable cylindrical part, and the spiral groove is arranged on an outer surface of the cylindrical sliding part.

In an embodiment, the housing comprises the swirl imparting means, wherein the plurality of flow passages extend through the housing, wherein the housing comprises an opening at a first end of the housing, wherein the adjusting mechanism comprises an adjustable insert comprising a cylindrical part configured to slide in the annulus between the housing and the central body and to cover at least a part of the plurality of flow passages, thereby adjusting the swirl imparting means for varying the swirling motion of the fluid.

The separator preferably comprises a ring shaped inlet body arranged around an outer surface of the housing and over the plurality of flow passages, the ring shaped inlet body configured to receive a fluid flow and to allow the fluid flow to pass through all of the plurality of flow passages.

Preferably, the central body comprises an opening at a first end thereof adjacent the first end of the housing, wherein the central body comprises radial slots for guiding a movement of the adjustable insert, wherein an inner side of the cylindrical part of the adjustable insert comprises protrusions extending at least partially into the radial slots.

In another embodiment, wherein the swirl imparting means comprise a plurality of vanes extending from the central body, wherein the plurality of vanes comprises a plurality of respective rotatable vane parts, each rotatable vane part being configured to rotate around a respective radial axis of the central body extending through the respective vane, wherein the adjusting mechanism is configured to rotate the plurality of rotatable vane parts. The plurality of vanes is preferably distributed over a circumference of the central body.

Preferably, each of the vanes together with an adjacent vane defines a respective flow passage of the plurality of flow passages, wherein the adjusting mechanism comprises a plurality of adjusting elements for rotating respective rotatable vane parts of the plurality of vanes, wherein each adjusting element is configured for adjusting the shape of a respective flow passage by rotating a respective rotatable vane part.

It is preferred that each adjusting element is arranged in the housing and comprises a main part extending towards the respective rotatable vane part and configured to rotate the respective rotatable vane part, and an arm part connected to the main part and extending substantially parallel to the central axis, wherein an end of the arm part opposite the main part is movably connected to the rotatable cylindrical part and arranged to be at least partially rotated by rotation of the rotatable cylindrical part.

The end of the arm part is preferably shaped as a fork and configured to connect to complementary cylindrical protrusions on an outer surface of the rotatable cylindrical part.

Preferably, the adjusting elements are configured to rotate a same amount upon rotation of the rotatable cylindrical part.

In a preferred implementation, each of the vanes comprises a static part fixedly connected to the central body, wherein the rotatable vane part extends from a downstream end of the static part.

In another aspect, there is provided a method of fluid separation, comprising: receiving an input flow in a converging fluid inlet section of a cyclonic fluid separator comprising a central body extending along a central axis of the cyclonic fluid separator through at least part of the inlet section of the separator, creating a swirling motion of the fluid by adjustable swirl imparting means arranged in the inlet section, thereby forming a swirling fluid flow; adjusting the swirl imparting means for varying the swirling motion of the fluid; and separating the swirling fluid into condensables depleted fluid components condensables enriched fluid components using a diverging fluid outlet section of the separator comprising an inner primary outlet for the condensables depleted fluid components and an outer secondary outlet conduit for the condensables enriched fluid components. The adjusting is preferably done before starting the separation process, viz. before receiving the input flow. The adjusting can alternatively be done during the separation process.

Preferably, a separator according to the first aspect is used in the method of fluid separation. Also, any of the separators described above can be advantageously used in the method of fluid separation.

According to a further aspect, there is provided a method of installing a cyclonic fluid separator, the method comprising: installing the separator by connecting an inlet section of the separator to a source of fluid; obtaining properties of the fluid source, the properties including a pressure and a composition of the fluid; and adjusting adjustable swirl imparting means of the separator for varying the swirling motion of the fluid according to the obtained properties of the fluid.

Preferably, a separator according to the first aspect is used in the method of installing a cyclonic fluid separator.

BRIEF DESCRIPTION OF THE DRAWINGS

The features, functions, and advantages disclosed herein can be achieved independently in various implementations or may be combined in yet other implementations, the details of which may be better appreciated with reference to the following description and drawings, in which.

DESCRIPTION OF THE INVENTION

First cage type

Figure 1:
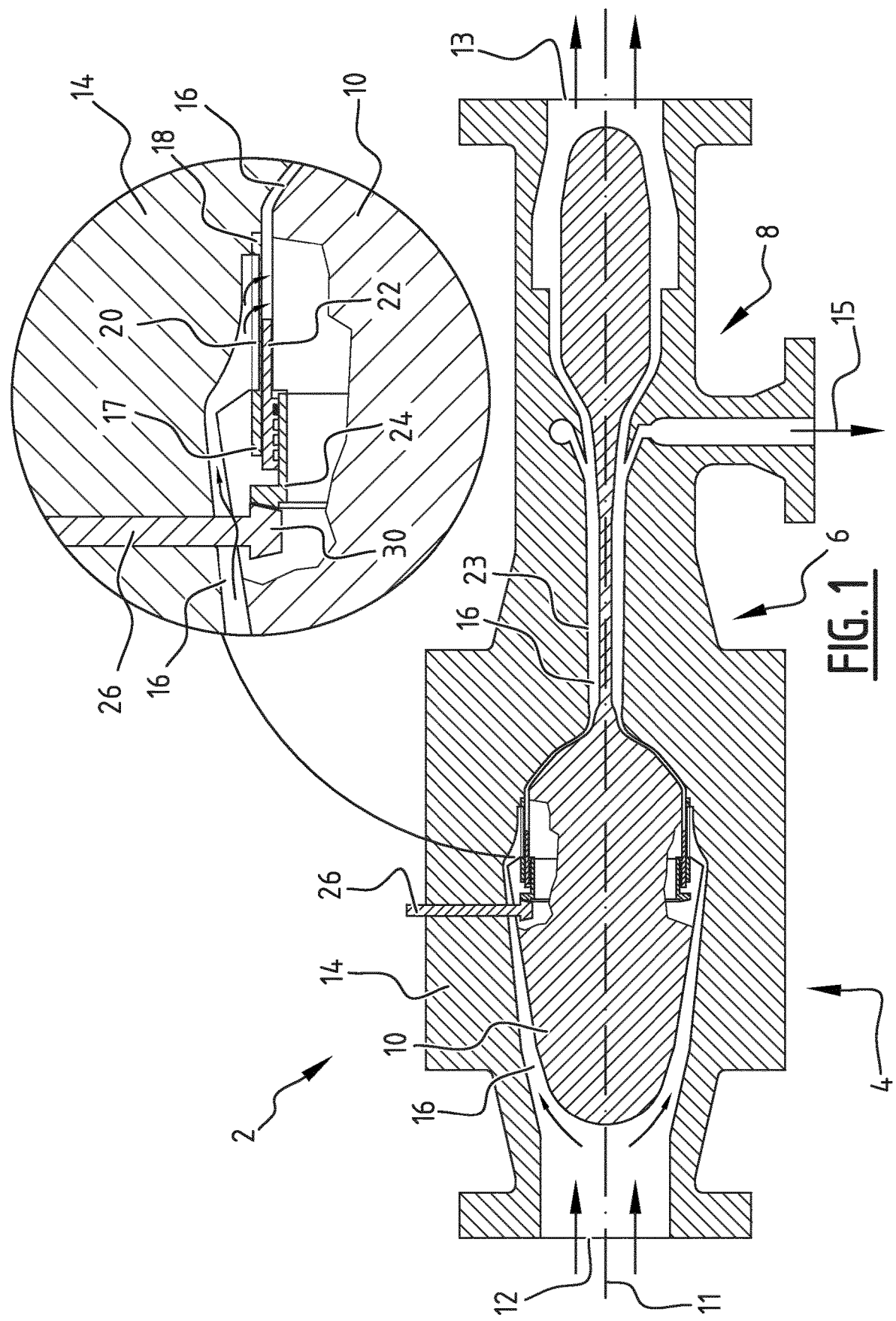
FIG. 1 depicts a longitudinal sectional view of a first cage type cyclonic fluid separator according to the present disclosure with an inset showing an enlarged section thereof.

A first implementation of a cyclonic fluid separator with variable swirl imparting means is the separator 2 as shown in FIG. 1, which comprises a converging inlet section 4, an intermediate section 6 comprising a throat portion having a smallest inner diameter and a diverging outlet section 8. The separator 2 comprises a central body 10 arranged in the housing 14, such that an annulus 16 is present around the central body 10. The central body 10 extends along a central axis 11 of the separator 2. It will be understood, and as also apparent from FIG. 1 (and FIGS. 5, 8A, 8B, 9A, 9B and 10), that the central body 10 extends along the central axis 11 of the separator 2 from the inlet section, through the intermediate section, to the outlet section.

When fluid enters at inlet 12, as indicated by the arrows, the fluid flows along a flow path along the surface of the central body 10 through annulus 16. As shown in the inset, the flow path passes a cylindrical cage part 17, which comprises flow passages arranged therein such that the fluid flows through from the outer side of the cylindrical cage part 17 towards the inner side thereof, where the flow exits. In the separator 2 the flow passages are formed by elongated slots 20 provided in the cylindrical cage part 17, each slot 20 extending in a longitudinal direction of the separator 2. The elongated slots 20 have a substantial tangential orientation with respect to the central axis 11 (see FIGS. 3 and 4), such that a swirl around the central body 10 is imparted to the fluid when passing the elongated slots 20. In other words, the cylindrical cage part 17 is used as a means to impart swirl.

The cylindrical cage part 17 is attached to the central body 10 with a first end 19 thereof and with a second end 18 to the housing 14. In separator 2, the first end 19 faces the inlet 12, while the second end 18 faces the outlet 13. After passing the cylindrical cage part 17, the fluid continues to flow along the annulus 16, but now in a swirling manner, swirling around the central body 10. The width of the annulus is designed such that cross-axial area of the annulus gradually decreases downstream of the swirl imparting means, here the cylindrical cage part 17, such that in use the swirling fluid is expanded and the fluid velocity in the annulus gradually increases and reaches a supersonic speed at a location downstream of the swirl imparting vanes. In such case the width of the annulus may vary such that, at the prevailing pressure difference between the inlet section and the outlet section during normal operation of the separator, the fluid flowing through the annulus reaches a supersonic velocity at or near an intermediate section of the tail section of the central body.

Due to the expansion, the fluid rapidly cools, causing condensation and/or solidification in the fluid stream. The centrifugal forces exerted by the swirling motion on the fluid will cause the relatively high density condensed and/or solidified condensables to swirl to the outer periphery of the interior of the intermediate section 6, which includes of throat portion 23, and of the diverging outlet section 8, such that they are discharged via the secondary outlet 15. Relatively low density gaseous components are concentrated near the central axis 11 of the separator 2, such that they are discharged via primary outlet 13.

The swirling motion of the fluid can be varied by the adjusting mechanism, comprising an adjusting element here embodied as a movably arranged cylindrical sliding part 22 configured to slide along the cylindrical cage part 17, thereby enabling the partial closure of the slots 20. The sliding part 22 therefore reduces the cross section available for flow of the cage part 17. In other words, the shape of the flow passages is adjusted by an adjusting element, here the sliding part 22.

Figure 3:
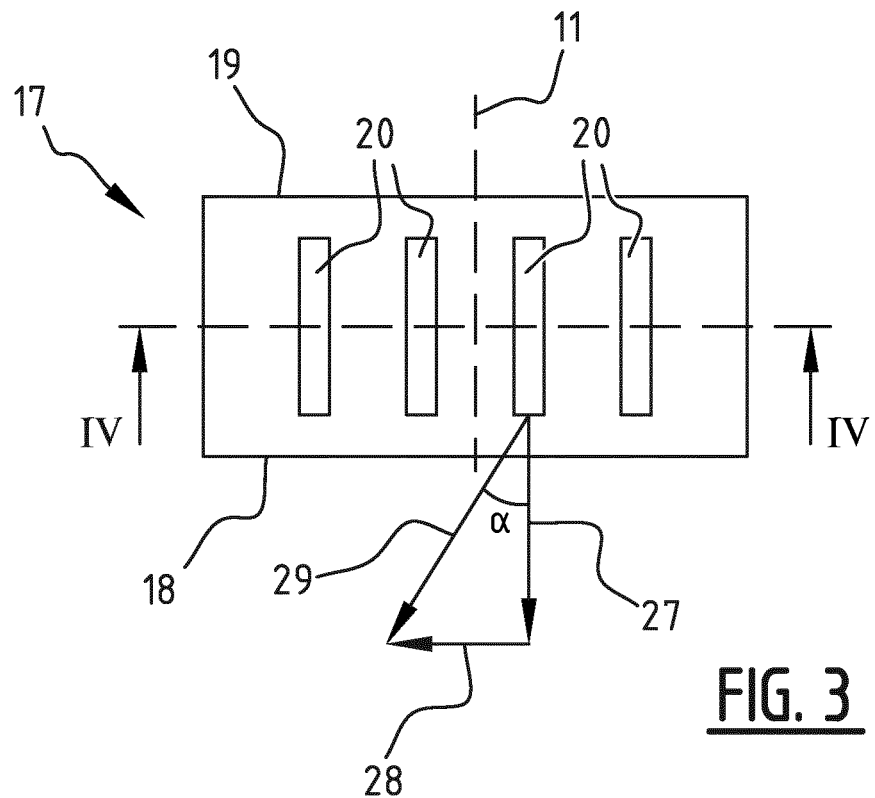
FIG. 3 depicts a side view of a cage used in the cage cyclonic fluid separator according to the present disclosure.
Figure 4:
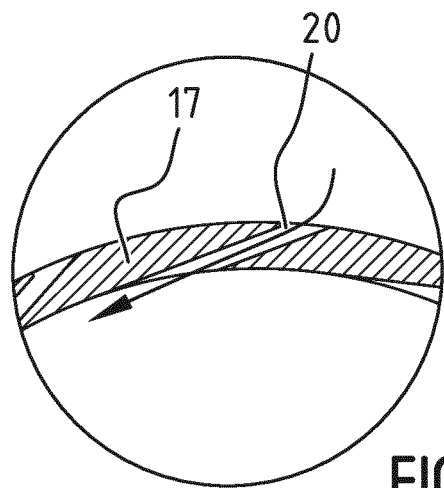
FIG. 4 depicts a cross sectional view of the cage of FIG. 3.

By reducing the cross section available for flow through the slots 20, the tangential velocity component or vector 28 of the total velocity component or vector 29 of the flowing fluid near the exit of the slots 20 is increased, as is graphically depicted in FIG. 3, when the same mass flow goes through the slots 20. The total velocity component 29 is the sum of the axial velocity component 27 and the tangential velocity component 28. The flow direction as compared to the central axis 11 is indicated by angle a. The ratio of the tangential component 28 of the flow velocity 29 to the axial component 26 of the flow velocity 29 can be varied in the range of 0.4 to 2.1. In terms of the angle α, this range correspond to 25° to 65° by moving the sliding part 22 and controlling the cross section through the slots 22 available for fluid flow.

By varying the tangential velocity, or more generally the swirling motion, the time period for the particles to drift to this outer circumference of the flow area along the length of the intermediate section 6 can be controlled such that for given properties of the fluid to be separated, the separation is improved and a larger amount of the condensed and/or solidified condensables are discharged via secondary outlet 15.

Figure 2A:
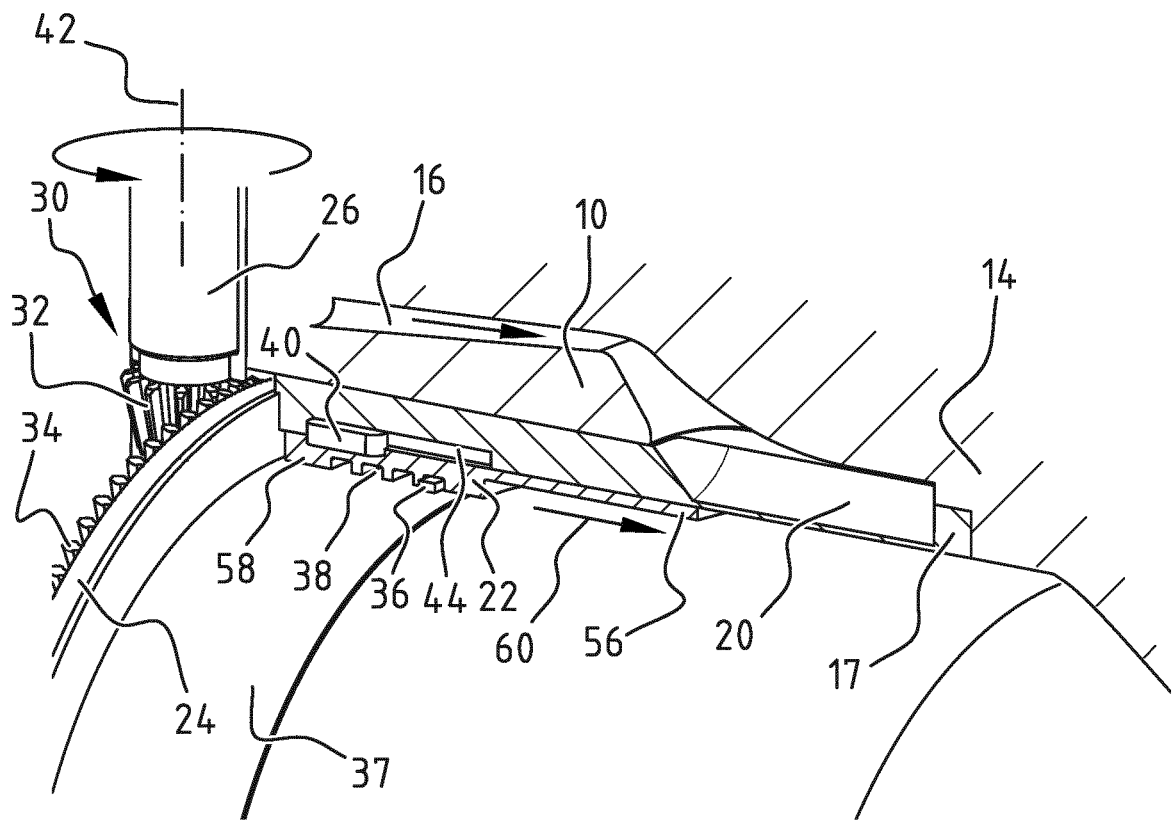
FIG. 2A depicts a partially perspective, partially sectional, view of the adjusting mechanism of the cage type cyclonic fluid separator of FIG. 1.

The cylindrical sliding part 22 is movable by a rotatable cylindrical part 24 arranged rotatably around the central axis 11. In the first cage type, the rotatable cylindrical part 24 is arranged in the central body 10. The rotatable cylindrical part 24 is rotated by the elongated drive stem 26, which can be rotated around its longitudinal axis 42 (see FIG. 2A). The drive stem 26 extends through the housing 14 and partially through the central body 10 with its internal end 30 adjacent to the rotatable cylindrical part 24.

At and near the drive stem 26, the housing 14 and the central body 10 are attached to each other, thereby also providing support for the central body 10. The annulus 16 is therefore partially blocked by at least the drive stem 26, as can be seen in the cross section of FIG. 1. The drive stem 26 can also be arranged through a spoke extending between the housing 14 and the central body 10. The movable parts, except for the sliding part 22, are arranged such that the fluid to be separated does not come into contact with the parts.

The internal end 30 of the drive stem 26 comprises a first bevel gear 32, which drives a second bevel gear 34 arranged on the rotatable cylindrical part 24. When rotating the drive stem 26, the rotatable cylindrical part 24 is rotated around the central axis 11. The rotatable cylindrical part 24 comprises a protrusion 36 on an outer side of forward section 37 of the cylindrical part 24. Forward here indicates an output side of the separator 2. The bevel gear faces away from the protrusion 36, to allow for the movement in the axial direction (forward and backward) as compared to the central axis 11 of the sliding part 22.

Figure 2B:
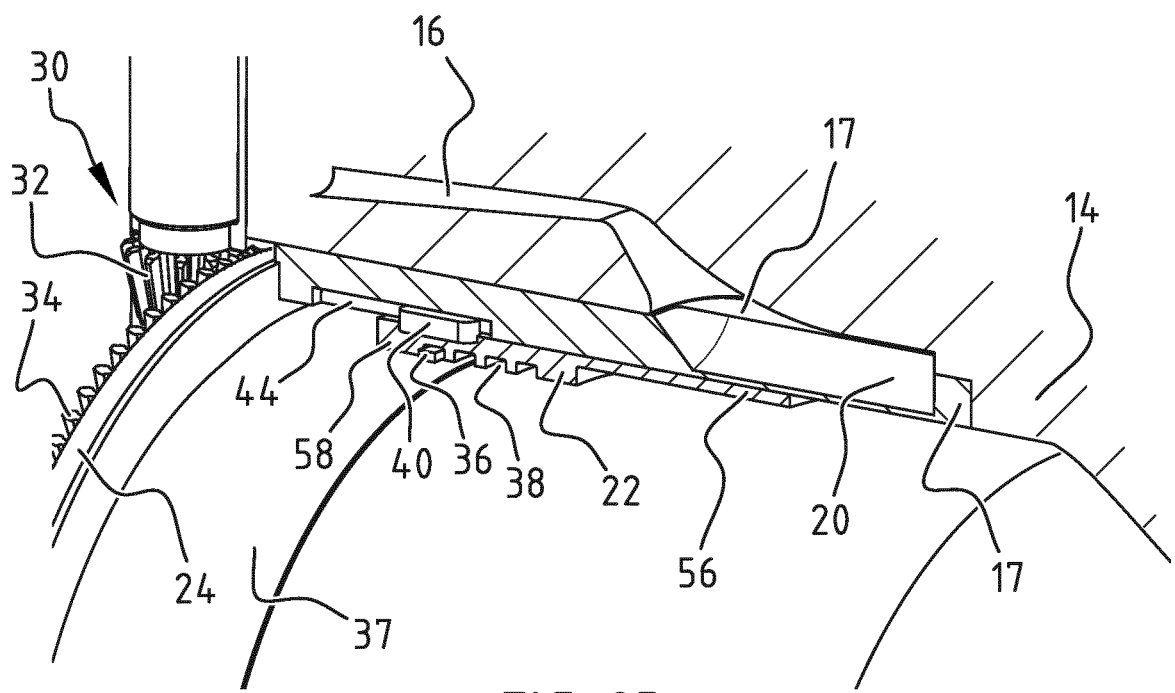
FIG. 2B depicts a view of the adjusting mechanism as in FIG. 2A, with the adjusting mechanism in a different position.

By rotating the cylindrical part 24, the protrusion 36 rotates around the central axis 11. The protrusion is positioned in a spiral groove 38. The groove is arranged on an inner side of a backward section of the sliding part 22 which is arranged around the forward section 37 of the cylindrical part 24. By rotating the cylindrical part 24 and thereby the protrusion 36, the sliding part 22 can be moved in a direction as indicated by the arrow 60. Then a forward section 56 of the sliding part 22 at least partially closes the slots 20, as shown in FIG. 2B. The slots 20 are opened again by rotating the cylindrical part 24 in the opposite direction, and the sliding part 22 will move in a direction opposite to the arrow 60.

The sliding part 22 comprises a protrusion 40 on its outer surface. The protrusion 40 is arranged to slide in a complementary groove 44 arranged in the cage part 17, or in the central body 10, such that the sliding part 22 is blocked from rotation around the central axis 11.

Second Cage Type

Figure 5:
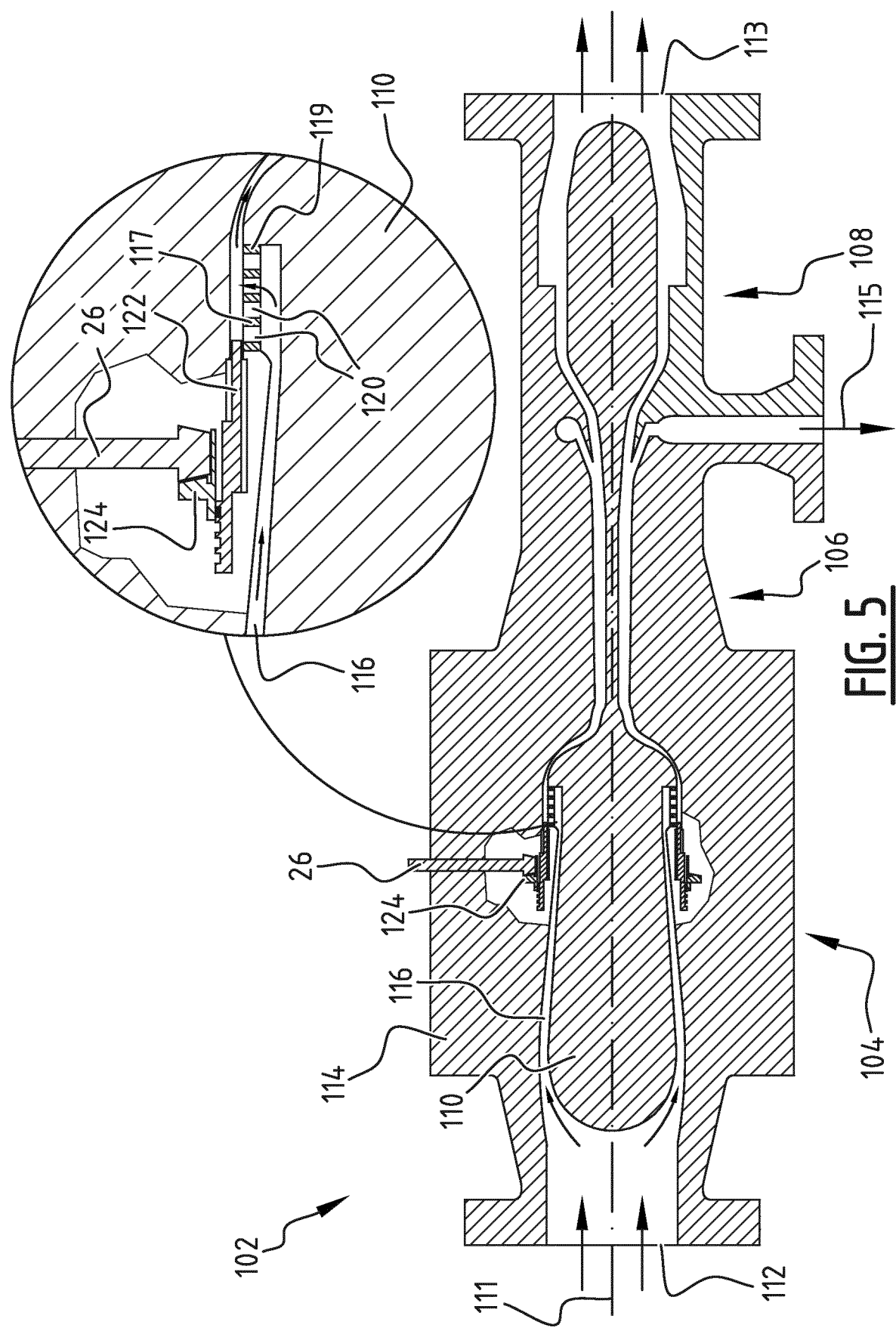
FIG. 5 depicts a longitudinal sectional view of a second cage type cyclonic fluid separator according to the present disclosure with an inset showing an indicated enlarged section thereof.

A second implementation of the cyclonic fluid separator with variable swirl imparting means is the separator 102 as shown in FIG. 5, which comprises a converging inlet section 104, an intermediate section 106 comprising a throat portion having a smallest inner diameter and a diverging outlet section 108. The separator 102 comprises a central body 110 arranged in the housing 114, such that an annulus 116 is present around the central body 110. The central body 110 extends along a central axis 111 of the separator 102. The second type is similar to the first type, except that the fluid flow is now from an inner side to an outer side of the cylindrical cage part 117.

When fluid enters at inlet 112, as indicated by the arrows, the fluid flows along a flow path along the surface of the central body 110 through annulus 116. As shown in the inset, the flow path passes the cylindrical cage part 117, which comprises flow passages arranged therein such that the fluid flows through from the inner side of the cylindrical cage part 117 towards the outer side thereof, where the flow exits. In the separator 102 the flow passages are formed by substantially cylindrical openings 120 provided on the cylindrical cage part 117, each opening 120 extending with longitudinal axis substantially perpendicular to the central axis, without an axial component compared to the central axis 111. The openings 120 can also be implemented with an axial component compared to the central axis 111.

The cage part 117 may, instead of the openings 120, alternatively comprise the slots 20 of the first cage type separator. Likewise, the cage part 17 may, instead of the slots 20, comprise the openings 120.

The openings 120 have a substantial tangential orientation with respect to the central axis 111, such that a swirl around the central body 110 is imparted to the fluid when passing the openings 120. In other words, the cylindrical cage part 117 is used as a means to impart swirl.

The cylindrical cage part 117 is attached to the central body 110 with a first end 119 thereof and with a second end 118 to the housing 114. In separator 102, different than in separator 2, the first end 119 faces the outlet 13, while the second end 118 faces the inlet 112.

By reducing the total cross section available for flow through the openings 120, the tangential velocity component of the total velocity component of the flowing fluid near the exit of the openings 120 at the outer side of cage part 117 is increased, in the same way as as shown in FIG. 3 for the first cage type and as described above.

The separator 102 comprises the elongated drive stem 126, a rotatable cylindrical part 124, and a cylindrical sliding part 122. The cylindrical sliding part 122 is movable by the rotatable cylindrical part 124, which is rotatably arranged around the central axis 111, and is arranged in the housing 114.

Figure 6:
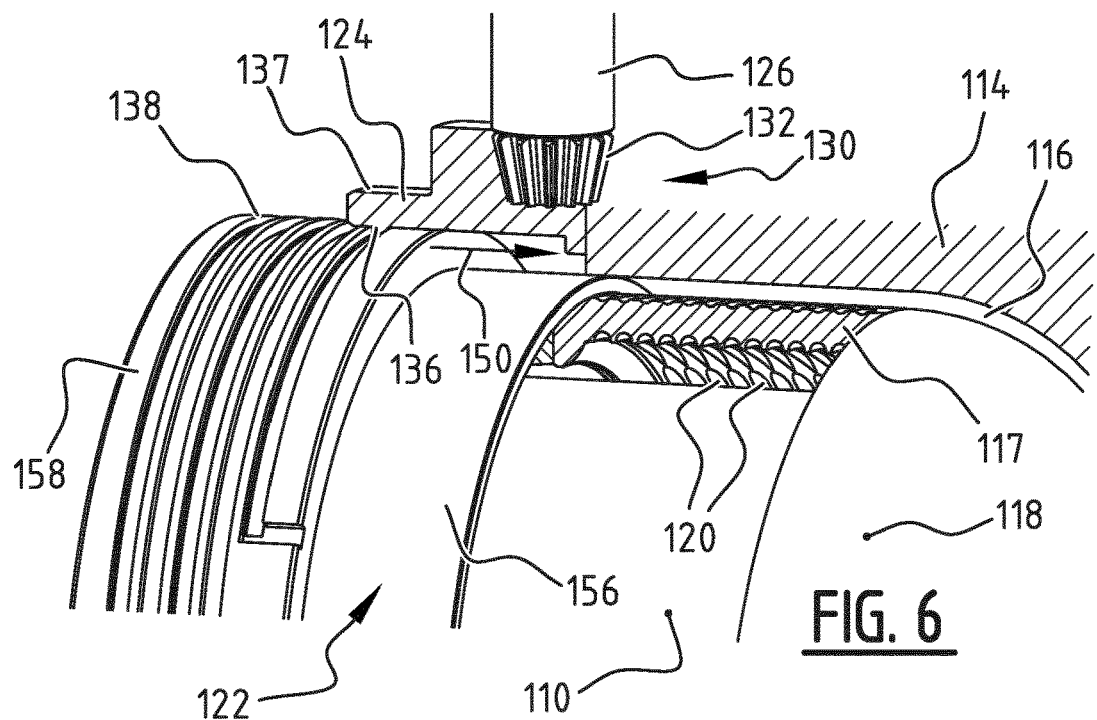
FIG. 6 depicts a partially perspective, partially sectional, view of the adjusting mechanism of the second cage type cyclonic fluid separator of FIG. 5.

The drive stem 126 extends through the housing 114 with its internal end 130 adjacent to the rotatable cylindrical part 124. As shown in FIG. 6, the internal end 130 of the drive stem 126 comprises a first bevel gear 132, which drives a second bevel gear 134 (see FIG. 7) arranged on the rotatable cylindrical part 124, similar to the equivalent parts of the first cage type separator 2. When rotating the drive stem 126, the rotatable cylindrical part 124 is rotated around the central axis 111. The rotatable cylindrical part 124 comprises a protrusion 136 on an inner side of a backside section 137 of the rotatable cylindrical part 124, opposite the bevel gear 134.

By rotating the cylindrical part 124, the protrusion 136 rotates around the central axis 111. The protrusion 136 is positioned in a complementary spiral groove 138 of the sliding part 122. In this case, the spiral groove 138 is arranged on an outer surface of a backward section 158 of the sliding part 122. By rotating the protrusion 136, the sliding part 122 can be moved in a forward direction as indicated by the arrows 150, thereby at least closing some of the openings 120. When rotating the protrusion 136 in the opposite direction, the sliding part 122 can be moved back again in a direction opposite the arrows 150.

Since in this second cage type separator 114 the flow is from an inner side of the cage part 117 to an outer side thereof, and the adjusting element or sliding part 122 is positioned along the outer side of the cage part 117, the adjusting mechanism can suitably be arranged in the housing 114 only.

When the sliding part 122 is covering at least some of the openings 120, a total cross section available for fluid flow provided by the openings 120, which represent in this case the flow passages, can thereby be adjusted.

Figure 7:
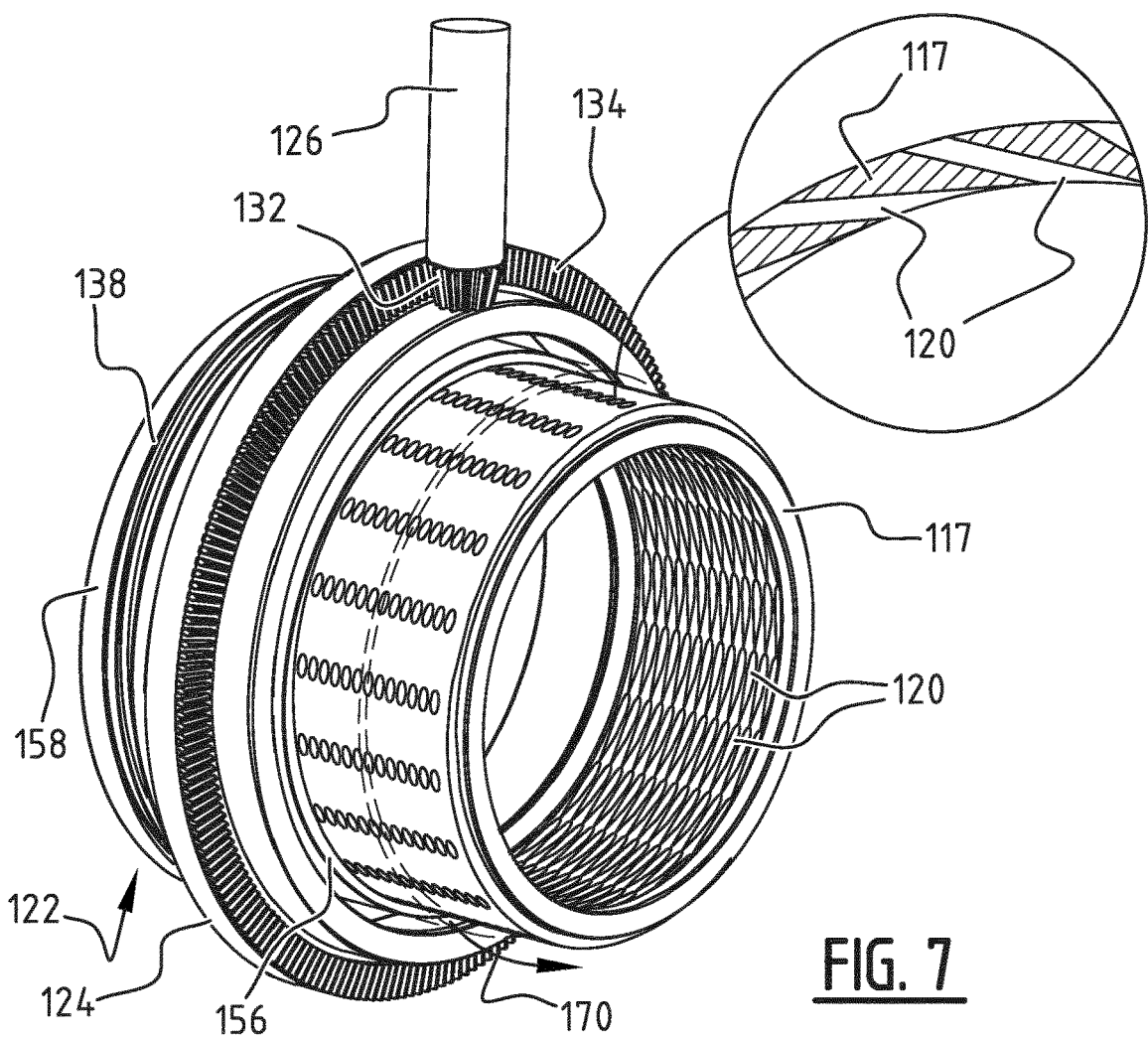
FIG. 7 depicts a perspective view of the adjusting mechanism of the second cage type cyclonic fluid separator of FIGS. 5 and 6, and an inset showing a cross section of the cage with flow channels.

In FIG. 7 is shown by dashed lines 170 an example of up to where the sliding part 122 slides over the cage part 117, thereby closing about half of the openings 120.

It is an option to arrange the various parts including sliding part 22 and 122 such that the slots 20 and openings 120 can cause a closure of the flow cross section available for fluid flow of at most 80%, at least 20% remaining open, thus adding an optional valve functionality to the separator 2 and 102.

Third Cage Type

Figure 8:
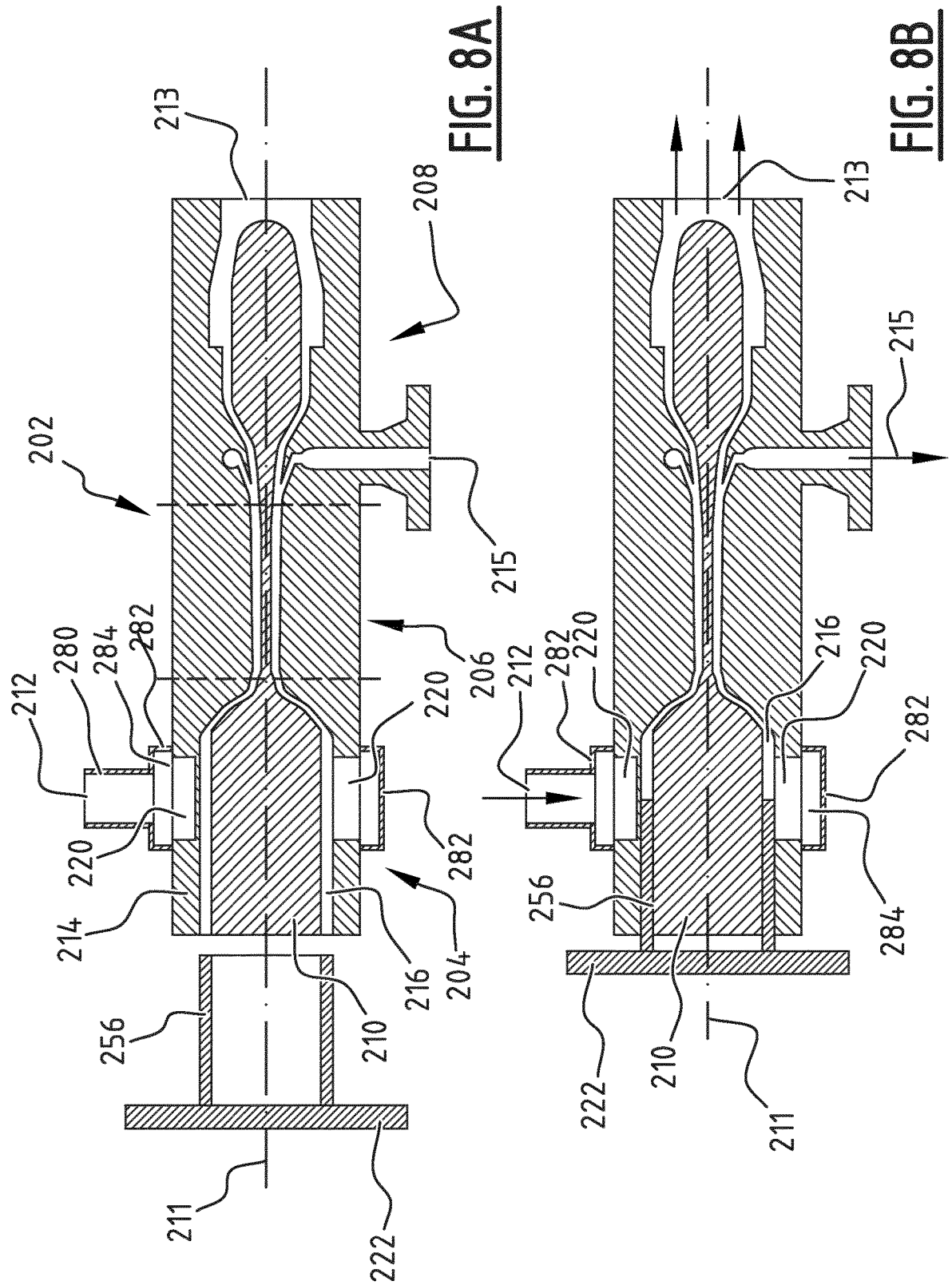
FIG. 8A depicts a longitudinal sectional view of an implementation of a third cage type cyclonic fluid separator according to the present disclosure.
FIG. 8B depicts a longitudinal sectional view the cyclonic fluid separator of FIG. 8A with adjusted swirl adapting means.

A separator 202 is shown in FIG. 8A, according to a third cage type. The separator 202 comprises a converging inlet section 204, intermediate section 206 comprising a throat portion having a smallest inner diameter, and diverging outlet section 208. The separator 202 comprises a central body 210 arranged in housing 214, such that an annulus 216 is present around the central body 210. The central body 210 extends along a central axis 211 of the separator 202.

In the third type, fluid enters at inlet 212, positioned at an angle with respect to the central axis 211, instead of axially as in the separators 2 and 102. The separator 202 comprises a sleeve 280 arranged around the housing 214 at a position where the housing comprises a plurality of slots or openings 220. The sleeve 280 is complementary to the housing 214, which both have a cylindrical shape. A sealing part 282 is arranged around the housing, and is preferably welded on the housing 214, but may also be otherwise fixed thereto. The sealing part 282 provides a second annulus 284 around the housing 214, such that the fluid flow is more or less equally divided around the housing 214.

In separator 202, as shown in FIGS. 8A and 8B, the slots 220 are substantially the same as the slots 20 of separator 2, but are here arranged in the housing 214. The slots have a substantial tangential orientation with respect to the central axis 211, thereby providing the swirling motion of the fluid entering annulus 216 through the slots. The slots 220 could also be implemented as the openings 120 of the separator 102.

The central body 210 extends from a position just downstream of the slots 220 towards a direction opposite the primary outlet 213 (to the left in FIGS. 8A and 8B) with a substantially constant diameter. Also the housing 214 has a substantially constant inner diameter from a position just downstream of the slots 220 towards a direction opposite the primary outlet 213. In this way, the sliding member 222, comprising a cylindrical part 256, can slide into the annulus 216 between the central body 210 and the housing 214. The cylindrical part 256 can then partially block fluid flow through the openings 220, in the same way as sliding parts 22 and 122 of respectively the first and second cage type, as also shown in FIG. 1 and FIG. 5 respectively. Thus the tangential velocity component of the fluid flowing into annulus 216 and around the central body 210 can be adjusted. The sliding member 222, being an adjusting element, has the role of adjusting the swirl imparted onto the fluid.

The sliding member 222 is positioned according to the processing conditions of the fluid to be separated, and then fixed in that position to the housing with suitable fixing elements (not shown). The sliding member 222 can be adjusted when the separator 202 is not in use.

Figure 9:
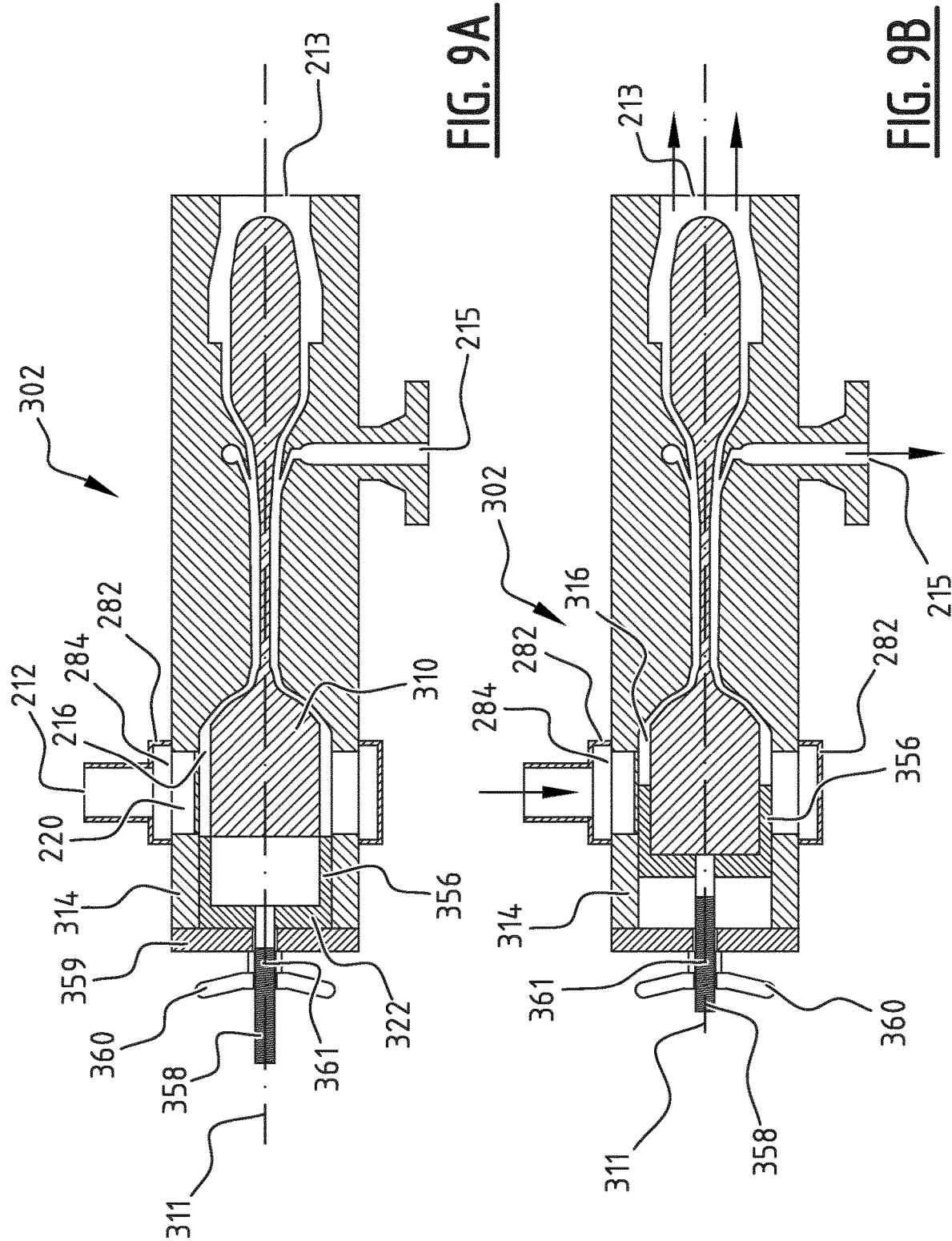
FIG. 9A depicts a longitudinal sectional view of another implementation of the third cage type cyclonic fluid separator.
FIG. 9B depicts a longitudinal sectional view of the cyclonic fluid separator of FIG. 9A with adjusted swirl adapting means.

As an alternative, as shown in FIGS. 9A and 9B, the separator 302 comprises an online adjustable sliding member 322. The separator 302 is substantially the same as separator 202, except for the arrangement of the sliding member and the housing 314. The sliding member 322 comprises a threaded rod 358 extending to an exterior of the housing 314, through a hole comprised in housing cap 359. The housing 314 here comprises a butterfly screw 360 arranged with complementary inner thread 361 around the screw thread of the threaded rod 358, allowing adjustment of the position of the cylindrical part 356 of the sliding member 322 to a blocking position of the slots 220 (see FIG. 9B) or a non-blocking position not blocking the slots 220 (see FIG. 9A). Adjustment is now possible when the separator 302 is in use. The threaded rod 358 and butterfly screw 360 together function as fastening elements for fastening the sliding member 322.

Vane Type

Figure 10:
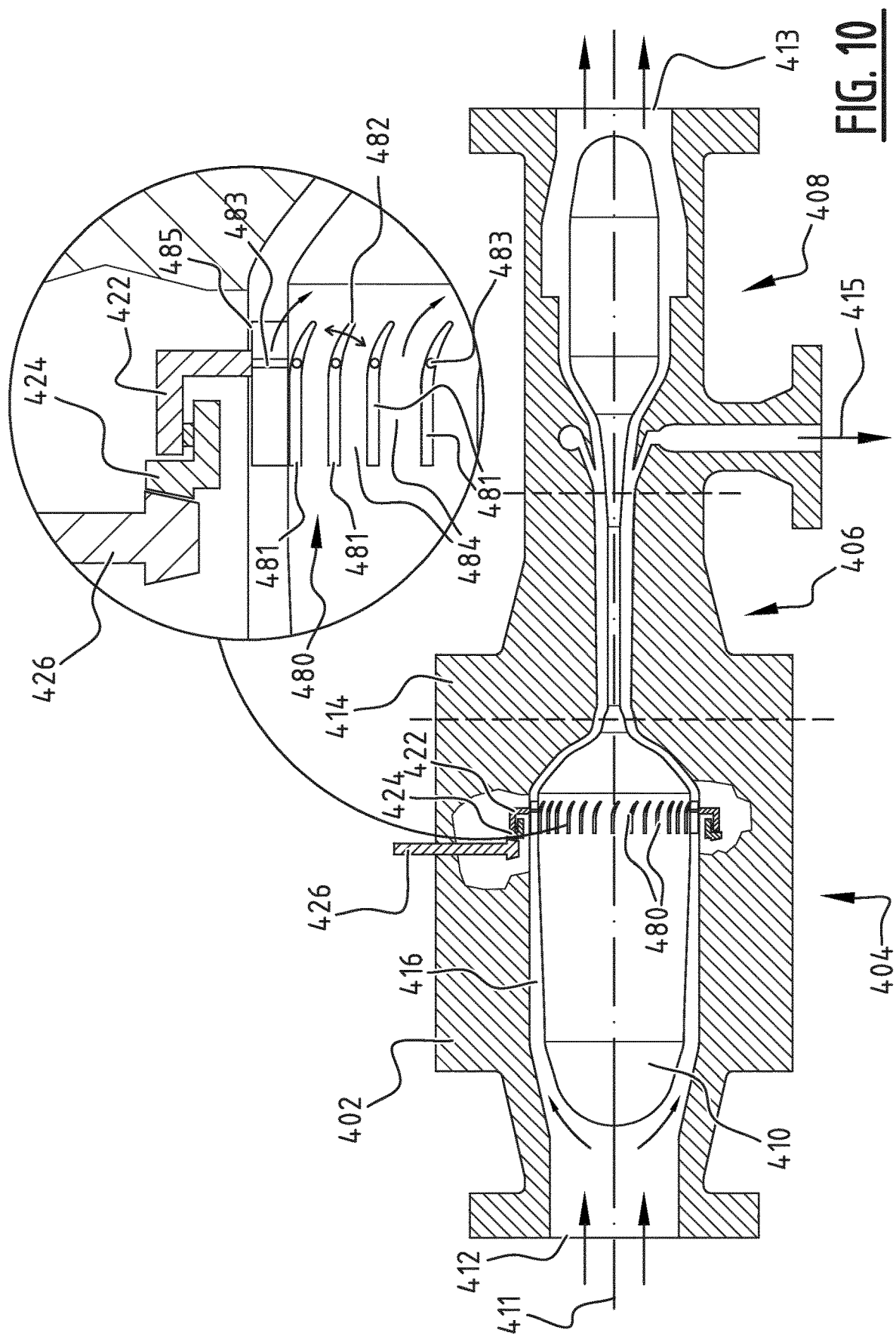
FIG. 10 depicts a longitudinal sectional view of a vane type cyclonic fluid separator according to the present disclosure with an inset showing an enlarged section thereof.
Figure 11:
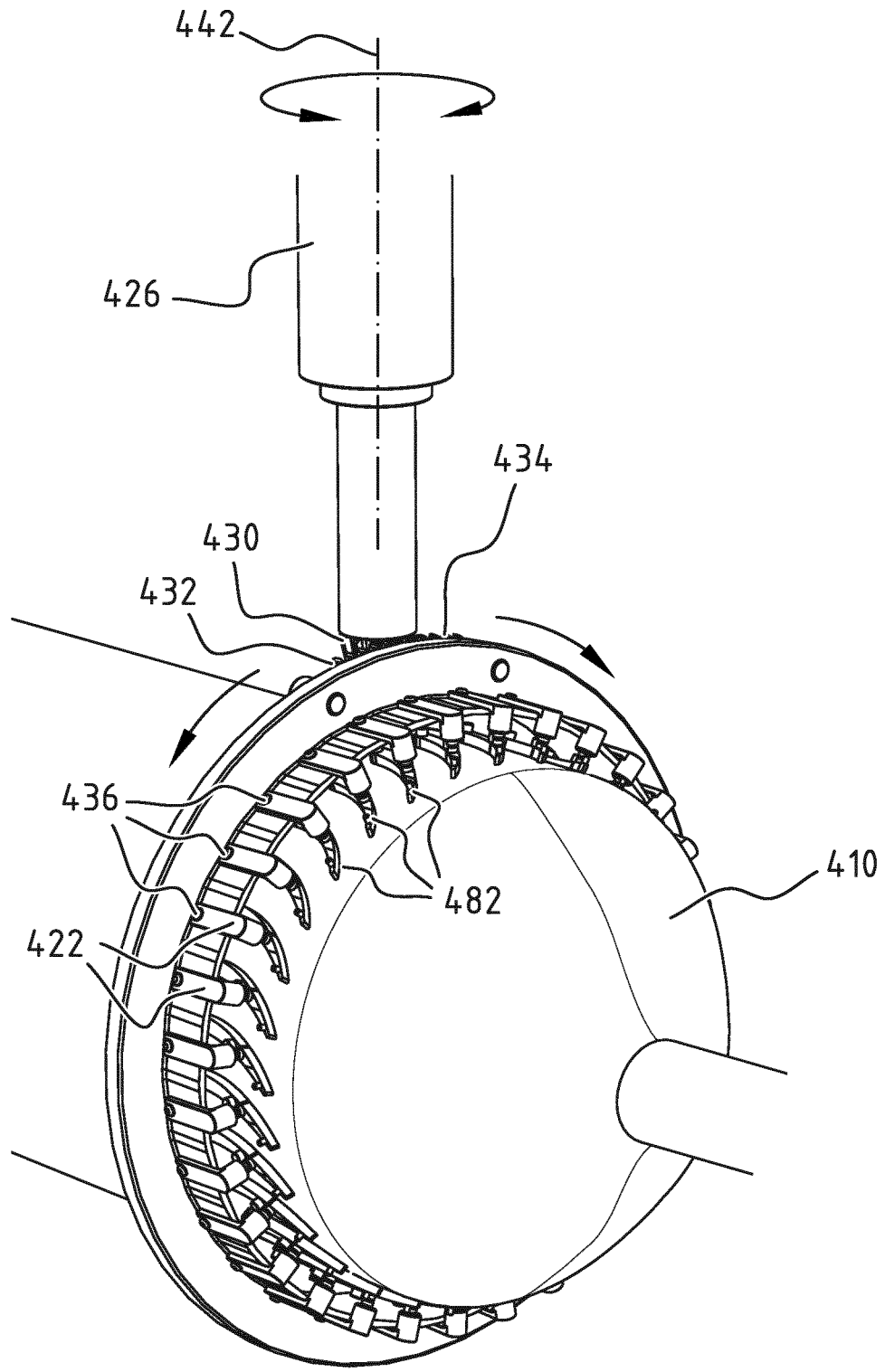
FIG. 11 depicts a perspective view of the adjusting mechanism of the vane type cyclonic fluid separator of FIG. 10.
Figure 12:
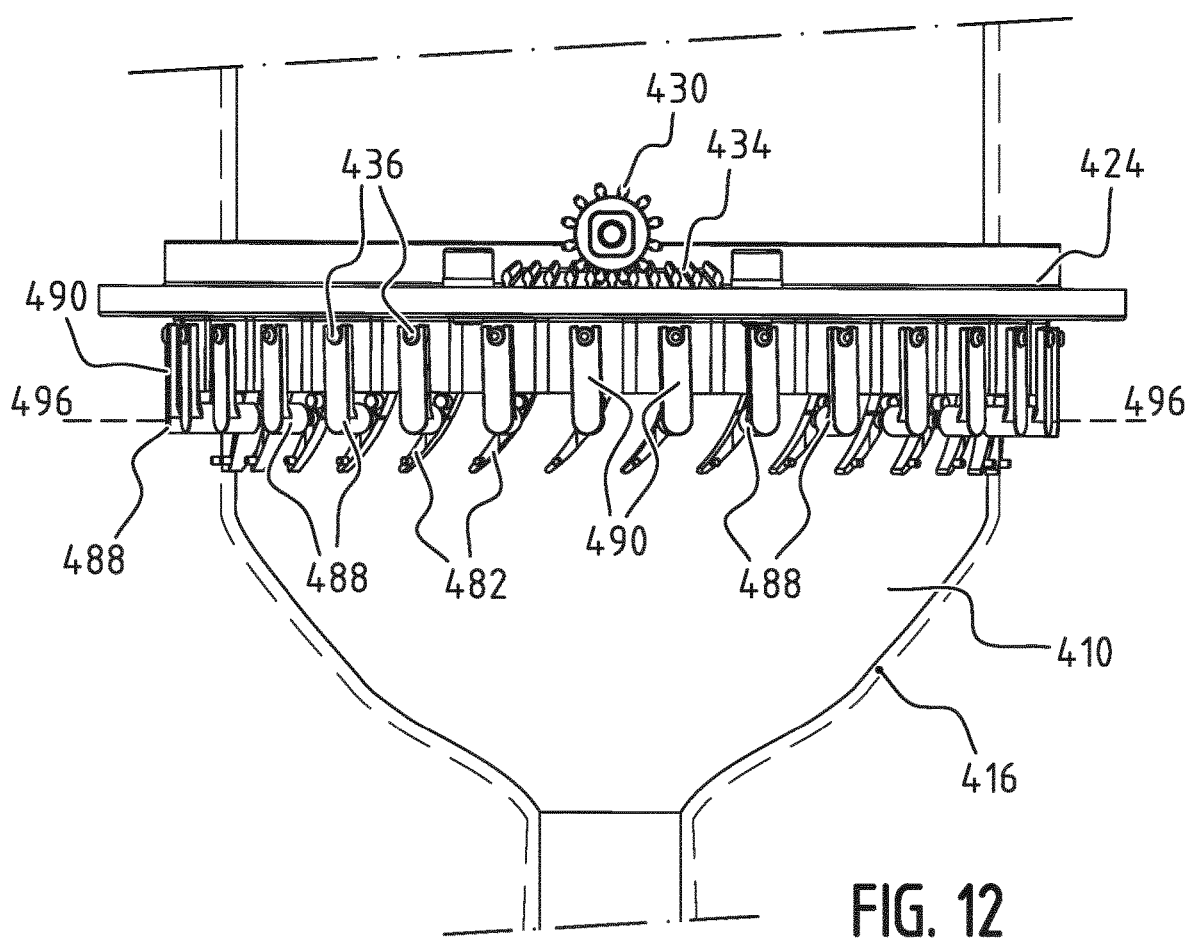
FIG. 12 depicts a top view of the adjusting mechanism of FIG. 11.

A further implementation is separator 402 as shown in FIG. 10. The separator 402, like separators 2, 102, 202 and 302 comprises a converging inlet section 404, an intermediate section 406 comprising a throat portion having a smallest inner diameter and a diverging outlet section 408. The separator 402 comprises a central body 410 arranged in the housing 414, such that an annulus 416 is present around the central body 410. The central body 410 extends along a central axis 411 of the separator 402.

Figure 14:
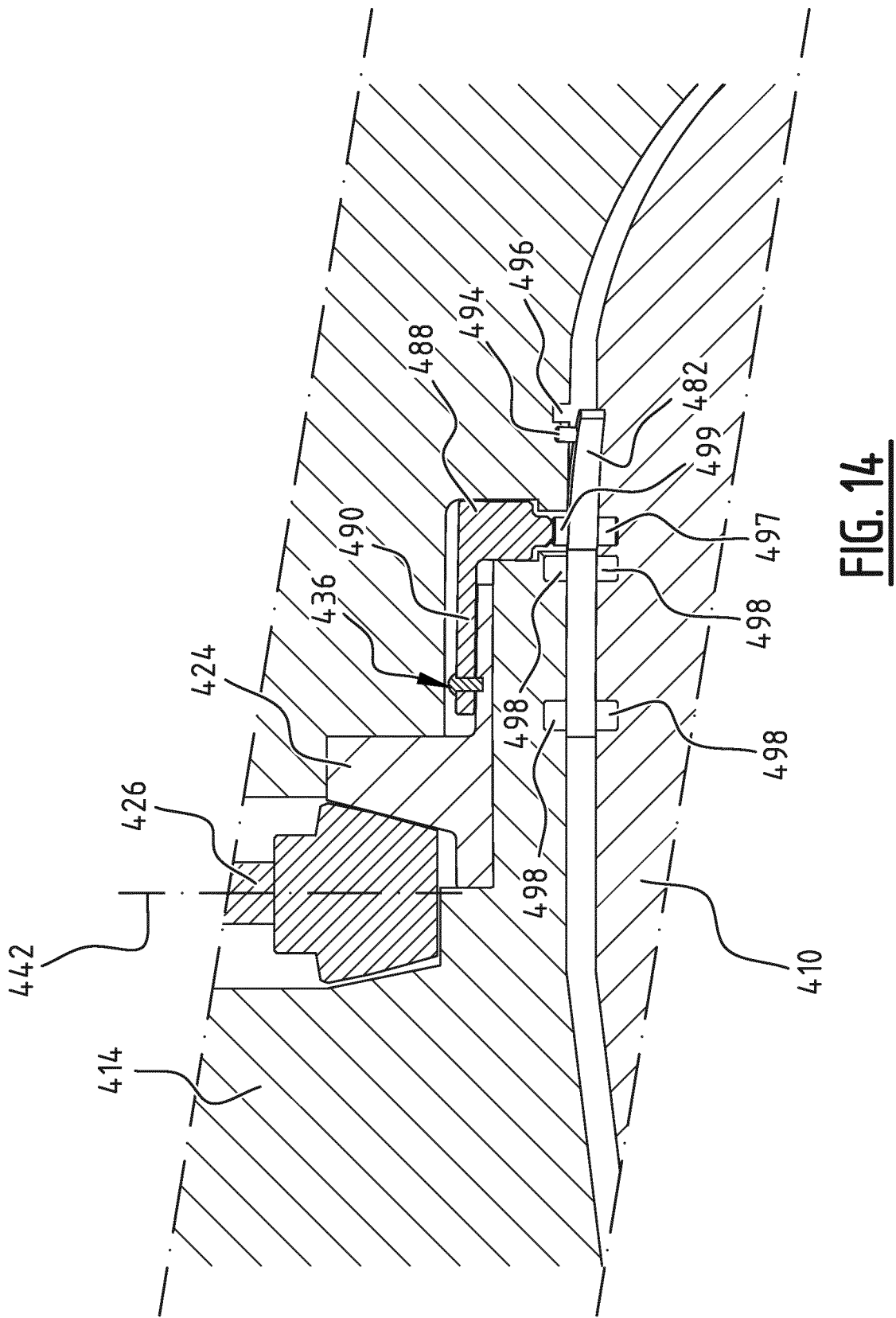
FIG. 14 depicts a longitudinal sectional view of the adjusting mechanism of the vane type cyclonic fluid separator of FIG. 10.

Swirl is imparted onto the fluid flow by a plurality of vanes 480, positioned in the annulus 416. Here the vanes 480 each comprise a static vane part 481, and a rotatable vane part 482. The static vane part 481 is fixed to the central body 410 and/or the housing 414 with fixing elements 498. The rotatable vane parts 482 are rotatably connected to the central body 410 with respective fixing elements 497 (FIG. 14). Lateral movement of the rotatable vane parts 482 is prevented by cylindrical protrusion 499, rotatably arranged in the housing 414. The rotatable vane parts 482 are configured to rotate a round respective axles 483. The spaces in between the vanes 480 are flow passages 484 where through the fluid is forced to pass. The rotatable vane parts 482 are configured to rotate around respective axes 496 that are arranged normal to the surface of the central body 410.

The separator 402 comprises an adjusting mechanism including a rotatable cylindrical part 424 arranged rotatably around the central axis 411 and in the housing 414. The rotation of the cylindrical part 424 causes movement of a plurality of adjusting members 422, each converting the rotation of the cylindrical part 424 into a rotation of respective rotatable vane parts 482. The adjusting mechanism comprises an elongated drive stem 426, which extends partially into the housing, with a first end 430 adjacent to the cylindrical part 424. The cylindrical part 424 is rotated by drive stem 426, in the same way as the corresponding parts of separator 2 and 102.

The working of the adjusting mechanism of the vane type separator 402 is shown by reference to FIGS. 11-14, wherein the housing is not shown. When rotating drive stem 426 around its longitudinal axis 442, the bevel gear 432 arranged at the first end 430 of the drive stem 426 moves the adjacent complementary gear 434 arranged on a part of the rotatable cylindrical part 424.

Figure 13:
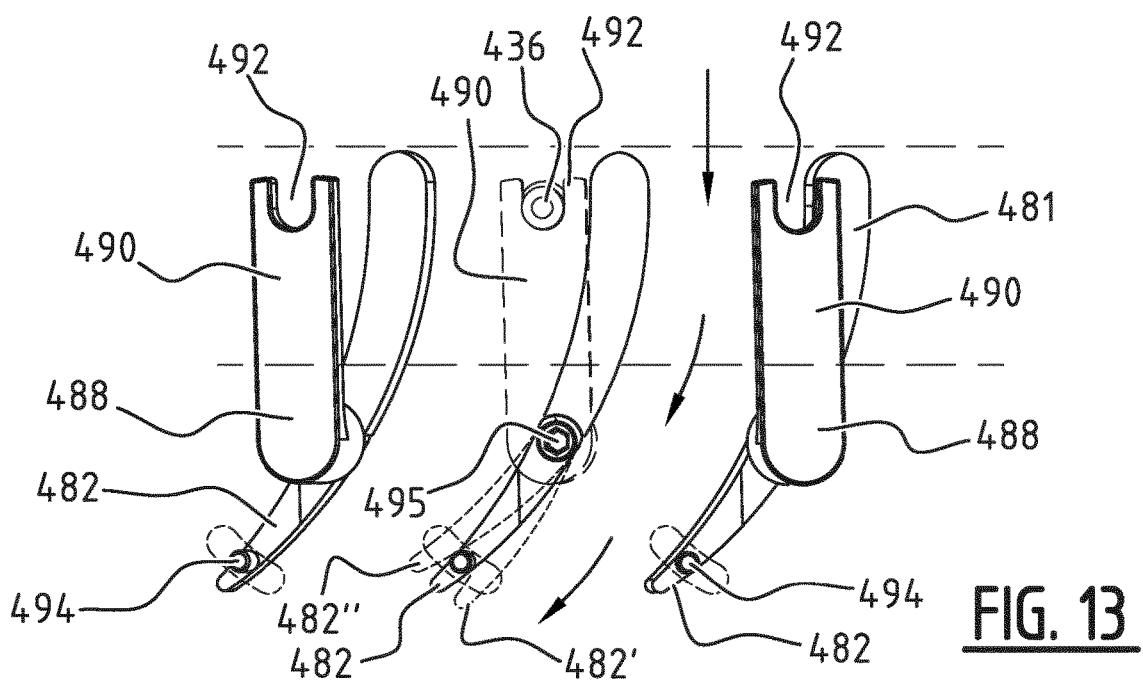
FIG. 13 depicts a top view of three vanes of the vane type cyclonic fluid separator of FIGS. 10-12, showing adjustability thereof.

The rotatable cylindrical part 424 comprises a plurality of protrusions 436, arranged in respective notches 492 in the ends of arm parts 490 of the adjusting members 422. The ends of arm parts 490 are thus fork shaped. A rotation of the cylindrical part 424 causes a rotation of the adjusting members 422 around respective axes 495 (FIG. 13).

Movement of the rotatable vane parts 482 around respective axes 495 is limited since the central body has a cylindrical shape. The rotatable vane parts 482 are configured to rotate from a central position to a first position 482' wherein less swirling motion is imparted onto the fluid, and to a second position 482" wherein more swirling motion is imparted onto the fluid. At a housing side of the rotatable vane parts 482, there is a slight gap 485 to allow for the movement of the rotatable vane parts 482. The preferred maximum rotation compared to the central position is 20° in either direction, more preferably 10°, since then the gap 485 is sufficiently small such that acceptable separator performance is achieved. In terms of a flow direction of the fluid flow passing the swirl imparting means with respect to the central axis, with a central position of 45°, the preferred rotation range corresponds respectively to a flow direction of 25° to 65°, preferably 35° to 55°, similar to FIG. 3.

At the downstream tip of the rotatable vane parts 482, there is provided a protrusion 494, which can slide in complementary groove 496 in the housing, to provide extra support for the tip, since large flow forces are experienced by the rotatable vane parts during operation.

The separators described herein in general enable variability and control of the swirling motion imparted to the flow in the inlet section. Therefore, the separator can be adjusted to changing process conditions and is thus highly flexible in its application. Also, the separation performance of the separator can be optimized when it is installed. Furthermore, beneficially the design can be standardized for a certain range or ranges of process conditions.

The mass flow, tangential velocity, and therewith the amount of expansion of the fluid in these separators can be smoothly adjusted.

The cage type separators advantageously comprise only a limited number of components in the adjusting mechanism, which are unlikely to break or snap off during operation and plug the flow section of the respective separators. The rotational cylinder parts and drive stem, together with the cage parts, which form the respective adjusting mechanism, are furthermore compact, requiring a limited amount of space in the central body and/or housing, thereby allowing the central body and/or housing to have a sufficient structural stiffness.

The second cage type implementation has a particularly compact adjusting mechanism, as the drive stem does not have to extend through a spoke between the housing and the central body. The drive stem is suitably arranged in the housing only. The structural stiffness is even less impacted by the presence of the adjusting mechanism.

Tests show that the cage type separators are such that the flow through and the performance of these cage type separators is essentially the same as for the conventional fixed vane-type cyclonic fluid separators.

This written description uses examples to disclose various implementations of the separators and methods. Other examples may occur to those skilled in the art. Such other examples may be within the scope of the claims. The patentable scope of the disclosure is defined by the claims.

The disclosure comprises the following clauses:

1. Cyclonic fluid separator, comprising
a throat portion arranged between a converging fluid inlet section and a diverging fluid outlet section comprising an inner primary outlet for condensables depleted fluid components and an outer secondary outlet for condensables enriched fluid components;
a central body extending along a central axis of the cyclonic fluid separator through at least part of the inlet section of the separator, wherein the central body has, at a location upstream of the throat portion, a larger outer width than an inner width of the throat portion;
swirl imparting means arranged in the inlet section for creating a swirling motion of the fluid within at least part of the separator, wherein the swirl imparting means are adjustable; and an adjusting mechanism configured for adjusting the swirl imparting means for varying the swirling motion of the fluid.

2. Cyclonic fluid separator according to clause 1, wherein the swirl imparting means comprise a plurality of flow passages positioned in a flow path that extends from the inlet section towards the outlet section, wherein the flow passages have an at least partially tangential orientation relative to the central axis, wherein the adjusting mechanism comprises at least one movably arranged adjusting element configured for adjusting a shape of the plurality of flow passages for adjusting the swirl imparting means for varying the swirling motion of the fluid.

3. Cyclonic fluid separator according to clause 2, wherein the adjusting mechanism is configured for adjusting the shape of the plurality of flow passages by adjusting a flow cross section available for fluid flow defined by the plurality of flow passages.

4. Cyclonic fluid separator according to clause 2 or 3, wherein the adjusting mechanism is configured to adjust the swirl imparting means such that, relative to the central axis, a ratio of a tangential component of a flow velocity of fluid flow passing the swirl imparting means to an axial component of the flow velocity is in the range of 0.4 to 2.1.

5. Cyclonic fluid separator according to any one of clauses 1 to 4, comprising a housing in which the central body is arranged such that an annulus is present between an inner surface of the housing and an outer surface of the central body.

6. Cyclonic fluid separator according to any of clauses 1 to 5, wherein the adjusting mechanism comprises a rotatable cylindrical part rotatably arranged around the central axis, wherein the adjusting element is arranged to be moved by rotation of the rotatable cylindrical part.

7. Cyclonic fluid separator according to clause 6, in dependence of clause 5, wherein the adjusting mechanism further comprises an elongated drive stem arranged rotatably around its longitudinal axis through an opening in the housing and configured to drive the rotation of the rotatable cylindrical part around the central body.

8. Cyclonic fluid separator according to any one of clauses 2 to 7, in dependence of clause 2, wherein the swirl imparting means comprise a fixedly arranged cylindrical cage part positioned around the central body, wherein the cylindrical cage part comprises the plurality of flow passages,
wherein the adjusting element is a cylindrical sliding part configured to slide along the cylindrical cage part and to cover at least a part of the plurality of flow passages thereby adjusting the swirl imparting means for varying the swirling motion of the fluid, wherein preferably the cylindrical sliding part is arranged to slide along a flow exit side of the cylindrical cage part.

9. Cyclonic fluid separator according to clause 8, wherein the cylindrical sliding part is configured to leave open at least 20% of a total flow cross section of the flow passages available for fluid flow.

10. Cyclonic fluid separator according to clause 8 or 9, in dependence of clause 6, wherein the rotatable cylindrical part and the cylindrical sliding part are arranged such that a rotational movement of the rotatable cylindrical part causes the cylindrical sliding part to slide along the cylindrical cage part.

11. Cyclonic fluid separator according to clause 10, wherein the rotatable cylindrical part comprises a protrusion, and wherein the cylindrical sliding part comprises a spiral groove, wherein the rotatable cylindrical part and the cylindrical sliding part are arranged such that the protrusion extends in the spiral groove and the cylindrical sliding part is configured to slide along the cylindrical cage part by rotation of the protrusion.

12. Cyclonic fluid separator according to any one of clauses 8 to 11, wherein the cylindrical cage part comprises a plurality of perforations forming the plurality of flow passages, wherein the perforations extend through the cylindrical cage part in the at least partially tangential orientation relative to the central axis.

13. Cyclonic fluid separator according to clause 12, wherein the plurality of perforations are a plurality of rectangular openings, wherein the plurality of rectangular openings extend with a longitudinal axis thereof substantially parallel to the central axis.

14. Cyclonic fluid separator according to any one of clauses 8 to 13, in dependence of clause 5, wherein the cylindrical cage part is fixedly connected at a first end thereof to the central body and at a second end thereof to the housing.

15. Cyclonic fluid separator according to clause 14, wherein the first end of the cylindrical cage part faces an inlet side of the separator, and the second end of the cylindrical cage part faces an outlet side of the separator, wherein an inner side of the cylindrical cage part is the flow exit side, wherein the inner side of the cylindrical cage part is spaced from an opposing outer surface of the central body.

16. Cyclonic fluid separator according to clause 15, in dependence of clause 11, wherein the rotatable cylindrical part is rotatably arranged in a groove or opening in the central body, the protrusion extends from an outer surface of the rotatable cylindrical part, and the spiral groove is arranged on an inner surface of the cylindrical sliding part.

17. Cyclonic fluid separator according to clause 14, wherein the first end faces an outlet side of the separator, and the second end faces an inlet side of the separator, wherein an outer side of the cylindrical cage part is the flow exit side, wherein the outer side of the cylindrical cage part is spaced from an opposing inner surface of the central body.

18. Cyclonic fluid separator according to clause 17, in dependence of clause 11, wherein the rotatable cylindrical part is rotatably arranged in a groove or opening in the housing, the protrusion extends from an inner surface of the rotatable cylindrical part, and the spiral groove is arranged on an outer surface of the cylindrical sliding part.

19. Cyclonic fluid separator according to clause 5, in dependence of clause 2, wherein the housing comprises the swirl imparting means, wherein the plurality of flow passages extend through the housing, wherein the housing comprises an opening at a first end of the housing, wherein the adjusting mechanism comprises an adjustable insert comprising a cylindrical part configured to slide in the annulus between the housing and the central body and to cover at least a part of the plurality of flow passages, thereby adjusting the swirl imparting means for varying the swirling motion of the fluid.

20. Cyclonic fluid separator according to clause 19, comprising a ring shaped inlet body arranged around an outer surface of the housing and over the plurality of flow passages, the ring shaped inlet body configured to receive a fluid flow and to allow the fluid flow to pass through all of the plurality of flow passages.

21. Cyclonic fluid separator according to clause 19 or 20, wherein the central body comprises an opening at a first end thereof adjacent the first end of the housing, wherein the central body comprises radial slots for guiding a movement of the adjustable insert, wherein an inner side of the cylindrical part of the adjustable insert comprises protrusions extending at least partially into the radial slots.

22. Cyclonic fluid separator according to any of clauses 1 to 7, wherein the swirl imparting means comprise a plurality of vanes extending from the central body, wherein the plurality of vanes comprises a plurality of respective rotatable vane parts, each rotatable vane part being configured to rotate around a respective radial axis of the central body extending through the respective vane, wherein the adjusting mechanism is configured to rotate the plurality of rotatable vane parts.

23. Cyclonic fluid separator according to clause 22, in dependence of clause 2, wherein each of the vanes together with an adjacent vane defines a respective flow passage of the plurality of flow passages, wherein the adjusting mechanism comprises a plurality of adjusting elements for rotating respective rotatable vane parts of the plurality of vanes, wherein each adjusting element is configured for adjusting the shape of a respective flow passage by rotating a respective rotatable vane part.

24. Cyclonic fluid separator according to clause 23, wherein each adjusting element is arranged in the housing and comprises a main part extending towards the respective rotatable vane part and configured to rotate the respective rotatable vane part, and an arm part connected to the main part and extending substantially parallel to the central axis, wherein an end of the arm part opposite the main part is movably connected to the rotatable cylindrical part and arranged to be at least partially rotated by rotation of the rotatable cylindrical part.

25. Cyclonic fluid separator according to clause 24, wherein the end of the arm part is shaped as a fork and configured to connect to complementary cylindrical protrusions on an outer surface of the rotatable cylindrical part, and/or
wherein the adjusting elements are configured to rotate a same amount upon rotation of the rotatable cylindrical part.

26. Cyclonic fluid separator according to any one of clauses 22 to 25, wherein each of the vanes comprises a static part fixedly connected to the central body, wherein each rotatable vane part extends from a downstream end of the static part.

27. Method of fluid separation, comprising:
receiving an input flow in a converging fluid inlet section of a cyclonic fluid separator comprising a central body extending along a central axis of the cyclonic fluid separator through at least part of the inlet section of the separator,
creating a swirling motion of the fluid by adjustable swirl imparting means arranged in the inlet section, thereby forming a swirling fluid flow;
adjusting the swirl imparting means for varying the swirling motion of the fluid; and
separating the swirling fluid into condensables depleted fluid components and condensables enriched fluid components using a diverging fluid outlet section of the separator comprising an inner primary outlet for the condensables depleted fluid components and an outer secondary outlet conduit for the condensables enriched fluid components.

28. Method according to clause 27, wherein a cyclonic fluid separator according to any one of clauses 1-26 is used.

29. Method of installing a cyclonic fluid separator according to any one of clauses 1-26, the method comprising:
installing the separator by connecting the inlet section to a source of fluid;
obtaining properties of the fluid of the fluid source, the properties including a pressure and a composition of the fluid; and
adjusting the swirl imparting means for varying the swirling motion of the fluid according to the obtained properties of the fluid.

The invention claimed is:
1. A cyclonic fluid separator, comprising:
a throat portion arranged between a converging fluid inlet section and a diverging fluid outlet section comprising an inner primary outlet for condensables depleted fluid components and an outer secondary outlet for condensables enriched fluid components;
a central body extending along a central axis of the cyclonic fluid separator from the inlet section, through the throat portion, to the outlet section of the separator, wherein the central body has, at a location upstream of the throat portion, a larger outer width than an inner width of the throat portion;
a housing in which the central body is arranged such that an annulus is present between an inner surface of the housing and an outer surface of the central body;
swirl imparting means arranged in the inlet section for creating a swirling motion of the fluid within at least part of the separator, wherein the swirl imparting means are adjustable, wherein the width of the annulus is designed such that a cross sectional area of the annulus gradually decreases downstream of the swirl imparting means; and
an adjusting mechanism configured for adjusting the swirl imparting means for varying the swirling motion of the fluid,
wherein the swirl imparting means comprise a plurality of flow passages positioned in a flow path that extends from the inlet section towards the outlet section,
wherein the flow passages have an at least partially tangential orientation relative to the central axis,
wherein the adjusting mechanism comprises at least one movably arranged adjusting element configured for adjusting a shape of the plurality of flow passages for adjusting the swirl imparting means for varying the swirling motion of the fluid,
wherein the swirl imparting means comprise a fixedly arranged cylindrical cage part positioned around the central body, wherein the cylindrical cage part comprises the plurality of flow passages,
wherein the adjusting element is a cylindrical sliding part configured to slide along the cylindrical cage part and to cover at least a part of the plurality of flow passages thereby adjusting the swirl imparting means for varying the swirling motion of the fluid, and
wherein the cylindrical cage part comprises a plurality of perforations forming the plurality of flow passages, wherein the perforations extend through the cylindrical cage part in the at least partially tangential orientation relative to the central axis.

2. The cyclonic fluid separator according to claim 1, wherein the adjusting mechanism is configured for adjusting the shape of the plurality of flow passages by adjusting a flow cross section available for fluid flow defined by the plurality of flow passages.

3. The cyclonic fluid separator according to claim 1, wherein the adjusting mechanism is configured to adjust the swirl imparting means such that, relative to the central axis, a flow direction is in the range of 25° to 65°.

4. The cyclonic fluid separator according to claim 1, wherein the adjusting mechanism comprises a rotatable cylindrical part rotatably arranged around the central axis, wherein the adjusting element is arranged to be moved by rotation of the rotatable cylindrical part.

5. The cyclonic fluid separator according to claim 1, wherein the cylindrical sliding part is configured to leave open at least 20% of a total flow cross section of the flow passages available for fluid flow.

6. The cyclonic fluid separator according to claim 1, wherein the rotatable cylindrical part and the cylindrical sliding part are arranged such that a rotational movement of the rotatable cylindrical part causes the cylindrical sliding part to slide along the cylindrical cage part.

7. The cyclonic fluid separator according to claim 1, wherein the plurality of perforations are a plurality of rectangular openings, wherein the plurality of rectangular openings extend with a longitudinal axis thereof parallel to the central axis.

8. The cyclonic fluid separator according to claim 1, wherein the cylindrical sliding part is arranged to slide along a flow exit side of the cylindrical cage part.

9. The cyclonic fluid separator according to claim 1, wherein the width of the annulus is designed such that the cross-sectional area of the annulus gradually decreases downstream of the swirl-imparting means, such that, when in use, the swirling fluid is expanded and the fluid velocity in the annulus gradually increases and reaches a supersonic speed at a location downstream of the swirl imparting means.

10. The cyclonic fluid separator according to claim 9, wherein the adjusting mechanism further comprises an elongated drive stem arranged rotatably around its longitudinal axis through an opening in the housing and configured to drive the rotation of the rotatable cylindrical part around the central body.

11. The cyclonic fluid separator according to claim 10, wherein the cylindrical cage part is fixedly connected at a first end thereof to the central body and at a second end thereof to the housing.

12. The cyclonic fluid separator according to claim 9, wherein the rotatable cylindrical part comprises a protrusion, and wherein the cylindrical sliding part comprises a spiral groove, wherein the rotatable cylindrical part and the cylindrical sliding part are arranged such that the protrusion extends in the spiral groove and the cylindrical sliding part is configured to slide along the cylindrical cage part by rotation of the protrusion.

* * * * *